US011090905B2

(12) United States Patent
Ullmann et al.

(10) Patent No.: US 11,090,905 B2
(45) Date of Patent: Aug. 17, 2021

(54) PRE-STRESSED GLASS ROLL

(71) Applicant: Schott AG, Mainz (DE)

(72) Inventors: Angelika Ullmann, Coppenbrügge (DE); Georg Sparschuh, Vadodara (IN); Gregor Kübart, Dresden (DE); Holger Wegener, Alfeld (DE); Jürgen Vogt, Oberheimbach (DE); Rainer Schwertfeger, Eschershausen (DE); Thomas Wiegel, Alfeld (DE)

(73) Assignee: Schott AG, Mainz (DE)

( * ) Notice: Subject to any disclaimer, the term of this patent is extended or adjusted under 35 U.S.C. 154(b) by 201 days.

(21) Appl. No.: 15/978,814

(22) Filed: May 14, 2018

(65) Prior Publication Data

US 2018/0257337 A1 Sep. 13, 2018

Related U.S. Application Data

(60) Division of application No. 14/246,800, filed on Apr. 7, 2014, now abandoned, which is a continuation of (Continued)

(30) Foreign Application Priority Data

Oct. 7, 2011 (DE) ..................... 10 2011 084 132.6

(51) Int. Cl.

*B32B 7/06* (2019.01)
*B32B 17/06* (2006.01)

(Continued)

(52) U.S. Cl.

CPC ................ *B32B 7/06* (2013.01); *B32B 3/263* (2013.01); *B32B 3/28* (2013.01); *B32B 3/30* (2013.01);

(Continued)

(58) Field of Classification Search

CPC ........... B32B 7/06; B32B 17/065; B32B 7/02; B32B 3/30; B32B 3/28; B32B 3/263;

(Continued)

(56) References Cited

U.S. PATENT DOCUMENTS 3,089,801 A 5/1963 Tierney et al.
3,622,298 A 11/1971 Machian et al.

(Continued)

FOREIGN PATENT DOCUMENTS

WO 87/06626 A1 11/1987
WO 02/051757 A2 7/2002

(Continued)

OTHER PUBLICATIONS

Notice of Transfer of the International Research Report and the Written Notice Issued for International Searching Authority or Statement dated Jan. 4, 2013 for International Application No. PCT/EP2012/004169 (10 pages).

(Continued)

*Primary Examiner* — Nancy R Johnson
(74) *Attorney, Agent, or Firm* — Taylor IP, P.C.

(57) ABSTRACT

A glass roll includes at least one glass film and one intermediate material one on top of the other in at least two layers onto a winding core. The glass film layers are held in place by the intermediate material layers. The glass roll is produced with a method including provision of a glass film, a winding core and a compressible intermediate material. At least one inside layer of the intermediate material is wound onto the winding core. The glass film and the intermediate material are wound onto the winding core in such a manner that the glass film is wound onto the winding core in alternating layers with the intermediate material. The intermediate material and/or the glass film is wound at a tensile stress acting in a longitudinal direction which causes a (Continued)

compression of the intermediate material and holds the glass film end in place on the glass roll.

18 Claims, 7 Drawing Sheets

Related U.S. Application Data application No. PCT/EP2012/004169, filed on Oct. 15, 2012.

(51) Int. Cl.

| | |
|---|---|
| ***B32B 3/26*** | (2006.01) |
| ***B32B 3/28*** | (2006.01) |
| ***B32B 3/30*** | (2006.01) |
| ***B32B 7/02*** | (2019.01) |

(52) U.S. Cl.

CPC .............. *B32B 7/02* (2013.01); *B32B 17/065* (2013.01); *B32B 17/066* (2013.01); *B32B 2266/025* (2013.01); *Y10T 428/24355* (2015.01); *Y10T 428/24612* (2015.01); *Y10T 428/24628* (2015.01); *Y10T 428/24752* (2015.01); *Y10T 428/24769* (2015.01)

(58) Field of Classification Search

CPC ............. B32B 17/066; B32B 2266/025; Y10T 428/24752; Y10T 428/24628; Y10T 428/24769; Y10T 428/24612; Y10T 428/24355

See application file for complete search history.

(56) References Cited

U.S. PATENT DOCUMENTS

| | | | |
|---|---|---|---|
| 8,867,191 | B2 | 10/2014 | Letz et al. |
| 8,980,382 | B2 | 3/2015 | Ingle et al. |
| 9,238,352 | B2 | 1/2016 | Merz et al. |
| 2008/0047940 | A1 | 2/2008 | Li et al. |
| 2010/0062234 | A1 | 3/2010 | Murashige et al. |
| 2011/0023548 | A1 | 2/2011 | Garner et al. |
| 2011/0059296 | A1 | 3/2011 | Wada et al. |
| 2011/0171417 | A1 | 7/2011 | Nakamura et al. |
| 2011/0177347 | A1 | 7/2011 | Tomamoto et al. |
| 2011/0200812 | A1 | 8/2011 | Tomamoto et al. |
| 2011/0217521 | A1 | 9/2011 | Teranishi et al. |
| 2011/0223386 | A1 | 9/2011 | Tomamoto et al. |
| 2013/0045366 | A1 | 2/2013 | Merz et al. |
| 2013/0240656 | A1 | 9/2013 | Merz et al. |
| 2014/0220309 | A1 | 8/2014 | Vogt et al. |
| 2014/0284577 | A1 | 9/2014 | Mennemann et al. |

FOREIGN PATENT DOCUMENTS

| | | | |
|---|---|---|---|
| WO | 03/051783 | A1 | 6/2003 |
| WO | 2010/038760 | A1 | 4/2010 |
| WO | 2012/074979 | A1 | 6/2012 |

OTHER PUBLICATIONS

Translation of the International Preliminary Report on Patentability and Written Opinion dated Apr. 10, 2014 for International Application No. PCT/EP2012/004169 (8 pages).

Chinese Search Report for Chinese Application No. 20128004933.5 (2 pages).

PRE-STRESSED GLASS ROLL

CROSS REFERENCE TO RELATED APPLICATIONS

This is a divisional of U.S. application Ser. No. 14/246,800, entitled "PRE-STRESSED GLASS ROLL," filed Apr. 7, 2014, which is incorporated herein by reference. U.S. application Ser. No. 14/246,800 is a continuation of PCT Application No. PCT/EP2012/004169, entitled "PRE-STRESSED GLASS ROLL", filed Oct. 5, 2012, which is incorporated herein by reference.

BACKGROUND OF THE INVENTION

1. Field of the Invention

The present invention relates to a glass roll consisting of a glass film which is wound onto a winding core with an intermediate material between the individual glass film layers.

2. Description of the Related Art

For greatly diverse applications, such as for example in the field of consumer electronics for example as glass covers, for organic light-emitting diode (OLED) light sources or for thin or curved display devices, or in the field or regenerative energies or energy technology, such as solar cells, thin glass is increasing used. Examples for this are touch panels, capacitors, thin film batteries, flexible circuit boards, flexible OLED's, flexible photo-voltaic modules or also e-papers. Thin glass is moving into focus more and more for many applications due to its excellent characteristics such as resistance to chemicals, temperature changes and heat, gas tightness, high electric insulation properties, customized coefficient of expansion, flexibility, high optical quality and light transparency and also high surface quality with very low roughness due to a fire-polished surface of the two thin glass entities. Thin glass is herein to be understood to be glass films having thicknesses of less than approximately 1.2 millimeters (mm) to thicknesses of 15 micrometers (μm) and smaller. Due to its flexibility thin glass in the embodiment of a glass film is increasingly wound after production and stored as a glass roll, or transported for cutting to size and further processing. After an intermediate treatment, for example coating or cutting to size, the glass film can again be wound in a roll-to roll process and supplied to an additional application. Compared to storing and transporting flat material, winding of the glass includes the advantage of a more cost effective compact storage, transport and handling during further processing.

With all of the excellent characteristics, glass as a brittle material generally possesses a lower fracturing resistance since it is less resistant against tensile stress. When bending the glass stresses occur on the outer surface of the bent glass. For fracture-free storing and fracture-free transport of such a glass roll the quality and integrity of the edges are of importance in the first instance, in order to avoid a crack or fracture in the wound or curved glass roll. Even damage to the edges such as minute cracks, for example micro-cracks, can become the cause and the point of origin for larger cracks or fractures in the glass film. Moreover, because of the tension on the top side of the wound or curved glass film, integrity and freedom of the surface from scratches, grooves and other surface defects is important in order to avoid the development of a crack or fracture in the wound or curved glass film. Thirdly, manufacture related interior stresses in the glass should be as small as possible or nonexistent in order to avoid development of a crack or fracture in the wound glass film. Since in commercial manufacturing all three factors can only be optimized to a limited extent, the vulnerability of fractures occurring in such a wound glass is further increased relative to the already existing limits of its material characteristics. Special precautions and conditions are therefore important for storage and transportation of such a glass, in order to avoid damage to the glass.

Firstly, oscillation or vibration of individual or all glass film layers on the glass roll is a problem. Moreover, an axial shifting of the wound glass as a whole on the winding core can lead to damage. Moreover, an axially lateral shifting of individual or of all glass film rolls relative to each other is extremely critical. The glass film layers are then positioned offset on top of one another, so that protruding edge regions occur which are very fragile. This effect is described in this instance as telescoping of the glass film layers, or respectively of the glass roll. In particular, a region protruding relative to another glass film layer of another, or of several other glass film layers can fracture or crack, for example from jolts, bumps or contact from the outside, or by oscillation or vibration. This means that in this condition the protruding regions of the glass film are unprotected in the glass roll structure.

It is also to be avoided that particulate inclusions between the glass film layers cause damage. On the one hand, they can scratch the surface which is facilitated by shifting or movement of the glass film layers relative to each other, or can lead to a crack or fracture due to punctiform compressive load.

In order to avoid a fracture caused in the thin glass by dirt particles between the glass surfaces, it is suggested in International Publication WO 87/06626 a method for coating of thin glass in the roll-to-roll process, utilizing a glass roll to use one or several layers of a material such as a plastic film which is non-abrasive for glass between the glass layers. The plastic film can be a polymer such as a polyester or poly-ethylene and can also contain an embossed pattern in order to protect the metal or metal oxide coating on the glass. No solution is thereby offered to the problem of lateral shifting or oscillation or vibration of the glass film layers. Also, no solution is offered in regard to the problem of an interaction between the glass surface or the coated surface and the intermediate layer material.

In connection with manufacture and winding a glass film U.S. Pat. No. 3,622,298 only suggests the use of a packing paper as an intermediate layer between the glass film layers without addressing the problem of shifting, oscillation or vibration of the glass film layers, for example during transport.

U.S. Pat. No. 3,089,801 discloses use of packing paper or aluminum foil, whereby the paper is adhered onto the thin glass as a removable reinforcement material. This is intended to provide greater strength to the glass during bending and handling, thereby also protecting it from fracturing during winding. This measure however does not prevent the cause of possible fractures of a glass film on a glass roll, which occur through shifting, oscillation or vibration of the glass film layers, for example during transport of the glass roll. An adhered paper layer also only prevents the broken pieces coming apart, but does not prevent emergence of a crack or fracture.

US Patent Application Publication No. 2011/0171417 goes even further and suggests laminating the thin glass between two layers of plastic prior to winding onto a glass roll, in order to protect the edges. One pressure sensitive support layer, adhered on one side of the thin glass is suggested which protrudes over the edge of the thin glass. On the other side of the thin glass, a cover layer is applied over the entire area or only in the region of the edges and protruding over the edges so that the edges are laminated between two plastic layers and the thin glass is subsequently wound. As in the case of U.S. Pat. No. 3,089,801, no solution is provided here either for prevention of the cause of possible fractures of a glass film on a glass roll. The risk of fractures in the glass film is also a problem when peeling off the adhering intermediate layers. Moreover, adhering residues of the adhesive, or influences upon the glass surface by the adhesive, are extremely disadvantageous in this suggestion of a solution.

In contrast, International Publication WO 2010/038760 recognized the problem and suggests the lateral protrusion of a cushioning sheet between the glass film layers. The glass roll has a winding core with flanges positioned at a distance from the wound glass. The laterally protruding cushioning sheet material is intended to prevent the edges of the wound glass film from bumping against a flange and fracture during a lateral shift of the entire glass roll on the winding core, or of individual glass film layers, or respectively telescoping of the glass film layers relative to each other. Here it is also disadvantageous that no solution is offered to prevent lateral shifting of the glass film layers or of the glass on the winding core. The result is that fractures in the glass occur in spite of the protruding cushioning or intermediate layers, when the glass roll, for example, telescopes or if the glass film layers undergo a sympathetic vibration. A solution is merely to be provided so that the edges remain at a distance from the flanges during shifting. It is furthermore disadvantageous that during unwinding of the glass roll the protruding intermediate layers can get caught on one another thus unacceptably stressing and fracturing the glass edges.

US Patent Application Publication No. 2011/0200812 illustrates winding of a glass ribbon, or respectively a glass film, onto a roll, whereby an intermediate layer is introduced between two layers of the glass film in order to avoid the occurrence of cracks in a glass film roll. In US Patent Application Publication No. 2011/0200812, the intermediate layer serves only to prevent damage of the glass film and to absorb extreme pressure which is exerted upon the glass roll.

International Publication WO 2010/038760 A1 also illustrates a glass roll wherein intermediate layers can be introduced between individual glass layers with the intent of reducing the risk of fractures. This document also illustrates only the introduction of the intermediate layer for the purpose of avoiding damage.

International Publication WO 87/06626 illustrates a glass roll wherein the individual glass layers were provided with a coating, for example sputtering as a coating process in order to separate the surfaces of adjacent glass layers in a glass roll. This document also illustrates only the introduction of the intermediate layer for the purpose of avoiding contact of adjacent glass layer surfaces and at the edges in the roll. If the roll is wound too loosely, the glass layers can shift relative to each other or can oscillate or vibrate.

What is needed in the art is to prevent the disadvantages described above and to provide a glass roll which—in addition to high protection for the wound glass—also avoids shifting, oscillation or vibration of the glass roll.

SUMMARY OF THE INVENTION

The present invention provides a glass roll which includes at least one glass film and one intermediate material which are wound one on top of the other in at least two layers onto a winding core, the glass film layers being held in place by the intermediate material layers. Being held in place in the current invention means that such forces are produced inside the glass roll between the wound glass layers, that an as straight as possible wound lateral surface of the wound roll is maintained with forces acting essentially laterally to the direction of winding, and that telescoping of the glass roll is largely avoided.

The inventors recognized that, depending upon the prestress force of the glass ribbon, the friction inside the roll can be influenced, thereby making it possible to avoid shifting of the glass layers relative to each other, in other words avoid telescoping of the glass roll.

If a wound roll is considered having wound layers n and a coefficient of friction μ occurs between the layers, and a radial force FR acts, then the result for friction FF between the wound product and the core is:

$$FF=PF*AF*\mu=FR*\mu*n$$

The radial force FR corresponds to the prestress force FV which can be adjusted during winding, for example on the intermediate material. Therefore FR=FV applies.

For the wound roll not to telescope it is necessary that the friction is greater than the force of weight acting upon the wound roll, in other words FF>FG. Since the relationship of the friction to the overall mass on the innermost glass film layer is the most unfavorable, the wound roll will most likely fail on the innermost layer. The force of weight acting upon the wound roll is described by:

$$FG = m*g = \left(t1*b*\pi*\left(2r*n+2*(t1+t2)*\left(n*\frac{n+1}{2}\right)\right)\right)*\rho*g$$

The following identifications are used in the formulas:

FV prestress force
FG force of weight
FR radial force
FF friction (between wound product and core)
n number of layers in wound roll
b material width of glass
r roll radius (core)
t1 glass thickness
t2 intermediate layer thickness
μ coefficient of friction
PF surface pressure
AF affected surface
m overall mass of wound product
p glass density
g=9.81 meters per second squared (m/s$^2$) g-force, g-acceleration As can be seen from the formula only relatively small prestress forces FV=FR are required to avoid telescoping of the roll.

It is to the credit of the inventors that they recognized that, with the previously asserted connections, it is possible with known characteristics such as b material width of glass;
r roll radius (core);
t1 glass thickness;
t2 intermediate layer thickness;
μ coefficient of friction; and
p glass density;

to determine the necessary pre-stress force FV with a predetermined number n of layers in the wound roll, in order to avoid telescoping of the wound glass roll with n number of layers in the wound roll.

The roll core normally has a diameter of 200 to 600 mm and can consist of any stable material such as wood, plastic, cardboard, metal or a composite material. Its surface may have a suitable non-slip, and possibly compressible, coating or a textured surface.

The glass film is a continuous long ribbon of a certain predefined length, whereby within one glass roll the glass film may be of one continuous length, or may consists of several shorter lengths, wound onto one roll. Such glass films normally have a width in the range of 300 to 800 mm, and a length of 200 to 1000 m. Such glass films are produced in a known method in the down-draw-method or in the overflow-downdraw-fusion-method (see for example International Publication WO 02/051757 A2 for the down-draw-method, as well as International Publication WO 03/051783 A1 for the overflow-downdraw-fusion-method). The formed and drawn continuous ribbon is wound onto a glass roll and its length cut to a specified predefined length.

The glass film can hereby consist of any suitable glass type, in particular of a borosilicate glass or an alumino-borosilicate glass. To reduce the risk of fractures and the occurrence of cracks during winding, the surface can be fire-polished and very smooth. As a result it can absorb a greater tensile stress on the outside of the bent glass and can be bent to a smaller radius. Depending on the surface roughness there is a critical stress level on the surface for each glass where an already present initial crack, whose depth is in the order of magnitude of the surface roughness, migrates further, destroying the glass (brittle fracture). The thinner the glass is the smaller are the stresses which are created on the surface by a certain bending radius. A 100 μm thick glass film with a laser scribed edge can, for example, be wound without a fracture around a radius of 50 mm, a 30 μm thick glass film without a fracture around a radius of 24 mm or a 15 μm thick glass film without a fracture around a radius of 12 mm. A 50 μm thick glass film can also be wound without a fracture around a radius of 5 mm, or for example, a winding radius of 2 mm is also possible. It has been shown that in this thickness range, for example between approximately 15-30 μm, an especially smooth surface is created by the thin draw.

In order to ensure fracture-free winding of thin glass the edges can also be provided—through suitable measures such as fire-polishing—largely free of micro-cracks and with little roughness, so that winding of the glass ribbon can be provided with a low probability of failure due to fracture.

The possibility of manufacturing a wound glass roll having a certain diameter is described by the probability of failure, meaning that the probability of failure when winding a glass film ribbon, or respectively the glass film, when evaluating a multitude of glass films having a length of 1000 meters (m) and a thickness in the range of between approximately 5 μm and 350 μm, for example 15 μm to 200 μm, onto a roll having a roll diameter in the range of 50 mm to 1000 mm, for example 150 mm to 650 mm, is less than 1%.

Table 1 specifies the edge strengths for various glass films, in other words the tensions in megaPascals (MPa) which are created during winding of a glass film with a roll radius:

| AF32 eco | | | | | | |
|---|---|---|---|---|---|---|
| | | Diameter [mm] | | | | |
| E-Modulus 74.8 | | 75 | 175 | 250 | 375 | 500 |
| Glass thickness [μm] | 20 | 20 | 9 | 6 | 4 | 3 |
| | 50 | 50 | 21 | 15 | 10 | 7 |
| | 70 | 70 | 30 | 21 | 14 | 10 |
| | 100 | 100 | 43 | 30 | 20 | 15 |
| | 150 | 150 | 64 | 45 | 30 | 22 |
| | 200 | 199 | 85 | 60 | 40 | 30 |

| D263 T eco | | | | | | |
|---|---|---|---|---|---|---|
| | | Diameter [mm] | | | | |
| E-Modulus 72.9 | | 75 | 175 | 250 | 375 | 500 |
| Glass thickness [μm] | 20 | 19 | 8 | 6 | 4 | 3 |
| | 50 | 49 | 21 | 15 | 10 | 7 |
| | 70 | 68 | 29 | 20 | 14 | 10 |
| | 100 | 97 | 42 | 29 | 19 | 15 |
| | 150 | 146 | 62 | 44 | 29 | 22 |
| | 200 | 194 | 83 | 58 | 39 | 29 |

| MEMpax | | | | | | |
|---|---|---|---|---|---|---|
| | | Diameter [mm] | | | | |
| E-Modulus 62.7 | | 75 | 175 | 250 | 375 | 500 |
| Glass thickness [μm] | 20 | 17 | 7 | 5 | 3 | 3 |
| | 50 | 42 | 18 | 13 | 8 | 6 |
| | 70 | 59 | 25 | 18 | 12 | 9 |
| | 100 | 84 | 36 | 25 | 17 | 13 |
| | 150 | 125 | 54 | 38 | 25 | 19 |
| | 200 | 167 | 72 | 50 | 33 | 25 |

These are the AF32eco, D263Teco and MEMpax glasses by SCHOTT AG., Mainz. Tension σ in MPa is specified in dependency on the glass thickness d in μm, as well as dependency on diameter D in mm of the wound glass roll. The formula for determining the edge strength, in other words the tension on the outside of the glass ribbon, is calculated as follows:

$$\sigma = E \cdot y / r$$

Whereby E is the elasticity modulus (E-modulus), y is half the glass thickness d/2 of the glass ribbon which is to be wound and r is the wound radius of the wound glass ribbon.

With the values for σ from Table 1 and the knowledge of the probability of failure for a multitude of tests which are analyzed, the probability of failure P for a glass ribbon having a certain length and roll radius can be determined. The probability of failure represents a Weibull-distribution whose width is characterized by the Weibull-parameter.

The Weibull-distribution is a continuous probability distribution over the cumulative positive real numbers which are used to describe lifespans and rate of failure of brittle materials such as glasses. The Weibull-distribution can be used to describe failure rates of technical systems. The Weibull-distribution is characterized by the broadness of the distribution, the so-called Weibull-modulus. It generally applies that the larger the modulus, the narrower the distribution.

If one conducts 2-point bending measurements with test lengths of 50 mm, the probability of failure of glass ribbons having a length L can be determined as follows with the knowledge of the Weibull-modulus:

$$P(L,r)=1-\exp\left(-\frac{L}{l}\left(\frac{\sigma(r)}{\mu}\right)^{\beta}\right)$$

P is the probability of failure of the glass ribbon having a length L and at a roll radius r; L is the length of the glass ribbon for which the probability or failure is determined; 1 is the relevant test length which is used in the 2-point test, for example 1=50 mm. σ (r) is the tension which occurs through winding with roll radius, μ is the tension β determined in the 2-point bending test in the Weibull-modulus which describes the width of the distribution and thereby the extensions to small strength properties.

The predetermination of the probability of failure makes it possible that, if one wishes to wind a glass ribbon having thickness d to a radius r, and having a winding length of 1000 m and wishes to achieve a probability of failure of 1% (or less) and if the relevant test length of the 2-point measurement is 50 mm to establish the following condition:

$$-14.5<\beta\cdot\ln\left(\frac{\sigma(r)}{\mu}\right)$$

If one assumes σ(r) for the tension from table 1, then the following results for parameter a that characterizes the system and which is also defined as "figure of merit":

$$a=\beta\cdot\ln\left(\frac{\sigma(r)}{\mu}\right)$$

Value α is, for example, increased with the assistance of the inventive measures, for example from 12 to 14.5, due to the increase of the edge strength.

The glass film which is wound according to the present invention generally has a thickness of a maximum of approximately 350 μm, for example a maximum of 100 μm, a maximum of 50 μm, a maximum of 30 μm, of at least 5 μm, at least 10 μm, or at least 15 μm. Here it is advantageous that such a thin glass film can be wound on small radii without a problem, due to their elasticity.

Exemplary glass film thicknesses include 15, 25, 30, 35, 50, 55, 80, 100, 130, 160, 190, 280 μm.

The glass film which is wound according to the present invention can have a fire-polished surface on at least one surface of its two sides, for example on the surface of both sides and on at least two edges located opposite each other, in order to provide the previously described probability of failure.

On the surface the root mean square average (RMS) Rq is a maximum of approximately 1 nanometer, for example a maximum of 0.8 nanometer, or a maximum of 0.5 nanometer. The average surface roughness Ra on the surface is a maximum of 2 nanometers, for example a maximum of 1.5 nanometer, or a maximum of 1 nanometer, always measured over a length of 670 μm. In one embodiment of the present invention these roughness values characterize the surface of both sides of the glass film. However, the side of the glass film which is subject to tensile stress during bending is in particular characterized by these roughness values.

This very smooth surface facilitates bending and winding of the glass film without the risk of disruptive fracturing due to tensile stresses on the glass surface, however also potentially results in lateral shifting of glass film layers relative to each other or respectively relative to each other in the glass roll and, to a lesser extent, telescoping of the glass film layers and/or a lateral shifting and movement of the wound glass on the winding core since the coefficient of friction of the glass surfaces is very low.

According to the present invention this is prevented in that the glass film layers are held in place on the glass roll by the intermediate material. In a wound state of the glass roll, the intermediate material always covers both sides of each glass film layer at least partially, for example over the entire surface. Initially at least one intermediate material layer is hereby wound onto the winding core. The first glass film layer is placed on this and the intermediate material and glass film are then wound alternately. When the entire glass film length has been wound, one or several intermediate material layers are wound around the outside of the glass roll in conclusion, in order to hold the last glass film layer in place. The lowest, or respectively the innermost, intermediate material layer, in other words the contact layer between the winding core and the first glass film layer can be provided alternatively also by another material or the winding core can be coated with a non-slip material. The last uppermost, or respectively the outside intermediate material layer or several other layers, can alternatively or in addition be of another material—for example a special outside protective film or paper and/or adhesive or fastening tape. It is important hereby that the uppermost glass film layer is securely held in place, in order to maintain the pressure of the interior intermediate layers.

According to the present invention, the intermediate material is wound during the winding process with a certain pre-stress or respectively a tensile stress at a magnitude great enough that the intermediate material is compressed or respectively stressed or also stretched relative to the compression, depending on the requirement. When winding in a roll-to roll process the glass film can also be wound at a certain pre-stress, or respectively a tensile stress at a magnitude great enough that the intermediate material is compressed or respectively stressed relative to the compression. A light compression of the intermediate material is generally sufficient. The compression creates a dense, compact wound unit of glass film and intermediate material, which as a rule is already sufficient for the glass film layers to be held in place. The glass film layers are held in place by a compressed intermediate material.

In one embodiment of the present invention the intermediate material possesses a predefined resiliency and in its compressed state applies a restoring pressure with a corresponding relaxation force against the adjacent glass film surfaces. This ensures that the glass film layers are held in place especially securely. The glass film layers are held in place in this case by a compressed intermediate material which exerts a restoring pressure against the glass film layers.

The intermediate material has, in interaction with the glass surface, a certain static friction which provides a measure of the fixation of the glass film layers against shifting. This static friction is increased by the restoring pressure, or respectively the surface compression, of the intermediate material against the glass film surface, or respectively the restoring pressure or respectively the surface compression of the glass film against the intermediate material. Depending on the intermediate material and level of pre-stressing the restoring pressure which is exerted by the intermediate material layer can be 1 to 200 kPa (kilopascal). A third factor for holding in place the glass film in the glass roll is the adhesion of the intermediate material on the very smooth glass surface. The adhesion is also increased by the compressive force of the intermediate material against the glass film surface or respectively the compressive force of the glass film against the intermediate material. The intermediate material thus forms a frictional connection with the glass film in the glass roll due to static friction, causing the glass film to be held in place in the glass roll.

The greater the tensile stress of the intermediate material and/or the glass film is during winding, the less air is wound into the roll, which in turn prevents oscillation or vibration of the glass film layers in the compound arrangement in the glass roll. Depending on the pre-stress or tensile stress with which the intermediate material and/or the glass film are wound, a defined roll hardness is achieved. The greater the roll hardness, the more securely is the glass film held in the glass roll.

Moreover, all unevenness in the glass film is compensated for by the compressible intermediate material. Increased stresses which can lead to a fracture in the glass film can thereby be avoided. Such unevenness is, for example, "warp" (larger waviness frozen-in by tension) and "waviness" (fine waviness on the surface) due to different thickness profiles.

Moreover, particulate inclusions of contaminants between the glass film layers are also collected by the compressible intermediate material, due to which stress concentrations between particle and glass film are compensated for and damages to the glass film can be avoided. However, these are only particles which were already present on its surface or on the surface of the intermediate material prior to winding the glass film.

The glass roll according to the present invention moreover has the advantage that due to the great roll hardness and holding the glass film layers due to the restoring pressure exerted upon the glass film by the intermediate material, a reliable sealing of the glass roll against penetration of contaminants between individual layers can be achieved.

In one embodiment of the present invention the intermediate material layers can also protrude laterally over the glass film edges in order to provide protection for these against bumping. The protrusion is hereby limited such that the intermediate material layers do not catch on one another during unwinding of the glass roll.

Another embodiment of the present invention provides that in place of an intermediate layer which extends over the width of the wound roll or even beyond, as described above, a narrower intermediate layer or a multitude of intermediate layers, for example intermediate layer ribbons, are used whereby the width of the individual intermediate layer ribbons is much less than the width of the wound glass ribbon. In this case, for example, the glass film has a first width and each of the intermediate material ribbons has a second width, wherein second width B2 is much narrower than the first width B1.

The width of the intermediate layer ribbons has practically no influence on the friction. If the width of the intermediate layer ribbons is reduced, the surface pressure increases automatically. The surface pressure multiplied by the effective area results in the radial force which, together with the coefficient of friction, results in the friction. On the other hand, by using several glass ribbons, geometric unevenness, for example waviness and warp, can very easily be compensated. In contrast, with a full surface intermediate layer unevenness can only be absorbed in the compressibility of the intermediate layer material. Depending on the intermediate layer material very high forces are necessary in part which do not transfer to the glass ribbon and, due to the glass strength and the associated missing rigidity, also cannot act upon the intermediate layer material. Since the forces are always balanced, the stresses will always form at a correlative level depending upon the hardness of the intermediate layer material. With incompressible intermediate layer materials, for example clean room films, the entire stresses must thus be absorbed by the glass ribbon.

In contrast there is the possibility to use narrow intermediate layer ribbons. This has the advantage that the glass ribbon is held at a distance from one to the next glass layer.

Geographic unevenness however can extend right and left of the narrow intermediate layer ribbon or also in the spaces when using several narrow intermediate layer ribbons.

A certain one-sided curvature is conceivable. With such glass ribbons a neutral axis is defined. The neutral axis is the line along the glass ribbon where the pressure and tensile forces cancel out if the glass ribbon were to be wound with edges aligned precisely with equal distance of the glass ribbon edges per wound layer. Since a glass ribbon having a curvature compared to other ribbon-like materials which are capable of being wound cannot be stretched or compressed, a conical distance of the glass layers from one another or respectively a funnel-shaped wound roll results when winding such a glass ribbon, whereby the inside of the funnel-shaped wound roll must absorb the entire compressive load, which generally leads to damage and fracturing of the edges.

To solve this problem, at least one intermediate layer ribbon is placed in the center of the glass ribbon along the neutral axis so that over the width of the intermediate layer of the neutral axis, to the right and left thereof winding can occur more or less compact. This type of arrangement of a narrow intermediate layer ribbon in the center of the width of the glass ribbon is advantageous since glass ribbons when they come from the draw process, for example from a down-draw line, oftentimes do not have parallel edges, but a certain curvature with a radius of, for example, one kilometer. If such glass ribbons are then wound into rolls the problem occurs that the ribbons are wound funnel-shaped. One side of the ribbon, that is the side of the ribbon facing toward the outside, is hereby wound loosely. The other side, that is the side facing the inside, is wound tightly. The entire pressure of the glass roll would thereby rest on the inside edge which could lead to fracture or damage of the glass edges. To prevent this, only a narrow strip which can be arranged as a single strip or several strips is provided as an intermediate layer, whereby the strip is arranged, for example, centered so that the different distances of the individual wound glass layer sides or respectively edges can arrange themselves freely relative to each other and the pressure is centered on the intermediate material layer. The holding force which prevents telescoping of the glass roll is then applied in the center of the glass roll and not on an edge at which cracks or fractures could easily occur. The central placement of the intermediate layer thus ensures that the glass roll, or respectively wound glass roll, has sufficient stability and breaking resistance, for example with glass ribbons with nonparallel edges.

The width of the intermediate layer is much less than the width of the glass layer, or respectively the glass ribbons, and is, for example in a range of approximately 10 to 70% of the width of the glass ribbon, or 30 to 50% of the width of the glass ribbon.

For use of narrow intermediate layer materials all the following materials—as can also be used for one single layer—can be considered. These can be used in all widths, for example in the range of approximately 2 mm to 600 mm and in any desired number, for example 2 to 300 pieces. The width of the individual intermediate layers can, for example, range from approximately 0.1% to 10% of the total width of the glass layer. Cords, threads, powders and granulates are possible. It is moreover possible that, if the intermediate layer is in the embodiment of an intermediate layer ribbon, the width of the intermediate layer ribbon varies in the progression of the ribbon, in other words increases or decreases. The width of the intermediate layer ribbon does not necessarily have to be uniform over the entire length of the ribbon.

The intermediate material is any compressible material which is suitable as intermediate material. In particular, the thickness should also be consistent with an economical application for the production of a glass roll. Porous materials whose gross density is lower than the density of the material mass (structural substance), for example soft elastic foams, or foam films are feasible. These can be homogeneous foam materials having a largely constant gross density over the cross section, or they can be integral foams. Such integral foams have a different gross density distribution over the cross section, whereby the gross density decreases towards the cross sectional center. Such foam intermediate material layers have advantageous bending characteristics and good adhesion on the almost pore-free surface.

Suitable intermediate materials are compressible materials such as foams, embossed or other structured papers, cardboards, plastic films of metal foils in web form or loose in the form of powder, shreds or granulations. Exemplary materials include compressible cardboard or a foam film, for example polyolefin foam, such as a cross-linked polyolefin foam or a foam film consisting essentially or completely of polyethylene or polyurethane. The foams are, for example, closed-cell. Moreover, compressible materials such as truck-tarpaulins or imitation leather are also suitable.

Moreover, multi-layer intermediate materials having a loose or solid compound structure are also suitable, whereby there is, for example, a material in glass film contact on the surface of the compound structure and a material at the core of the compound structure which is compressible. The core material may consist of several layers. The glass film contact material may also be arranged on only one surface of the intermediate material. The surface material is adapted to the contact with the glass film surface. Here, a good chemical compatibility is considered so that no residues of the intermediate material, for example silicone, remain on the glass surface or that no ion diffusion occurs. It should also be avoided that a change of the aging process of the glass film surface proceeds differently across the surface which would be particularly disadvantageous for subsequent coating processes and which could be caused, for example, by structured and heavily porous intermediate materials. The material at the core of the intermediate material compound structure is targeted toward good compression and is also a good restoring force.

The thickness of the intermediate material is, for example, in the range of less than approximately 2 mm, less than 1 mm, or less than 0.5 mm. In one embodiment where the glass ribbon has lateral laces—that is thickening in the edge region—the intermediate material is also thicker and can have a thickness of as much as approximately 8 mm. Moreover, several intermediate material layers can be wound on top of one another in order to create the necessary compensation between the thicker edge region and the thinner glass film across the width. A first intermediate material layer can also be arranged over the entire width of the glass film and above and/or below one or more narrower intermediate material layers can be arranged in the width of the thin glass film cross section between the glass film layers.

An exemplary intermediate material which, in interaction with a fire-polished glass surface, has a static friction $F_S$ in the range of 0.15 to 10 Newton (N), for example 1 to 10 N, is feasible. Static friction is understood to be the stress peak which must be overcome so that the intermediate material starts moving relative to the glass surface.

An exemplary intermediate material is moreover feasible which, in interaction with a fire-polished glass surface, has a frictional force $F_D$ in the range of 0.15 to 5 N, for example 0.2 to 2.5 N, or 1 to 2.5 N. Frictional force is understood to be the averaged force across the test path after overcoming the static friction which is necessary for a relative movement between the intermediate material and a glass surface.

The values for static friction $F_S$ and frictional force $F_D$ always apply according to a measurement in compliance with DIN EN ISO 8295 on an electromechanical universal testing machine by Schenk-Trebel at a standard operating environment of 23° C. and 59% relative humidity according to DIN 50 014 at a standard force of 1.96 N.

In an additional embodiment according to the present invention, it may be provided that the glass film is coated on at least one of its sides with a plastic layer, for example a polymer layer.

In one particular embodiment this plastic layer represents the intermediate material. This offers the special advantage that winding and unwinding is clearly easier since no material which is separate from the glass film needs to be provided on a separate roll or needs to be rewound onto a separate roll during unwinding.

The present invention also includes a method to manufacture a glass roll, including the provision of a glass film, a winding core and a compressible intermediate material, winding of at least one inside layer of the intermediate material onto the winding core, winding of the glass film and the intermediate material onto the winding core in such a manner that the glass film is wound onto the winding core in alternating layers with the intermediate material, whereby the intermediate material and/or the glass film is wound at a tensile stress acting in a longitudinal direction which effects a compression of the intermediate material, as well as holding the glass film end in place on the glass roll.

The winding core may consist of any rigid material which has a sufficient flexural rigidity and compressive resistance. The intermediate material is advantageously provided wound onto a roll. The glass film comes either in the form of a continuous ribbon from a manufacturing process such as the down-draw process or the overflow-down-draw-fusion process, or is provided wound as a glass roll.

From the intermediate material one or several layers are first wound onto the winding core, thus creating a wedge between the incoming intermediate material and that which is already wound. The start of the length of the glass film ribbon which is to be wound is inserted into this wedge and is wound in layers alternating with the intermediate material.

The glass film is thus covered on both surfaces, for example over the entire surfaces with the intermediate material. The intermediate material is hereby fed to the winding process and wound onto the glass roll at a certain pre-stress or respectively tensile stress acting in the longitudinal direction, whereby the speed of unwinding the intermediate material supply roll and winding of the glass roll are controlled in relation to one another. The intermediate material supply roll is always decelerated appropriately. The tensile stress is always measured via sensors and controlled accordingly. If the glass film is pulled from a roll, then the glass film too can be fed to the winding process and wound onto the glass roll at a certain pre-stress or respectively tensile stress acting in its longitudinal direction. In this case both the intermediate material and the glass film can be fed to the winding process and wound onto the glass roll at a certain pre-stress or respectively tensile stress acting in its longitudinal direction. In each case the tensile stress is adjusted so that a desired winding hardness is achieved and that the intermediate material undergoes a compression.

Once the end of the length of glass film ribbon which is to be wound is placed, one or several more layers of intermediate material are wound around the glass roll to hold the outer glass film layer and the glass film end in place. In addition or alternatively, an outer envelopment of the glass roll with another material such as a padded outer protective film, a paper or adhesive- or fastening tape can occur. It is hereby important that the uppermost glass film layer is securely held in place in order to avoid the glass film layers becoming loose and to maintain a restoring pressure on the intermediate layers.

The present invention includes moreover the use of a compressible material, for example a foam film as intermediate material between a glass film in a glass roll, whereby the intermediate material can be wound onto a winding core alternatively with the glass film in at least always two layers, and the intermediate material layers can hold the glass film layers in place. Such foam films are formed, for example, of polyolefin foam, such as a cross-linked polyolefin foam or also a polyethylene or polyurethane.

The present invention advantageously provides a simple and compact glass roll whereby lateral flanges and other expensive devices and packaging materials can be foregone, since the glass roll on the winding core is self-supporting and in itself stable with high protection for the wound glass film. The inventive glass roll can be transported vertical or tilted, that is with perpendicular or tilted axis, thus providing a large degree of freedom in handling of the glass roll. A glass roll of this type normally has a width of 300 to 1500 mm and an outside diameter of 300 to 1000 mm. The weight of such a roll is approximately 30 to 200 kilograms (kg). For longer transports or extended storage the glass roll can also be wrapped in a protective cover of a suitable packaging, depending upon transportation requirements.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
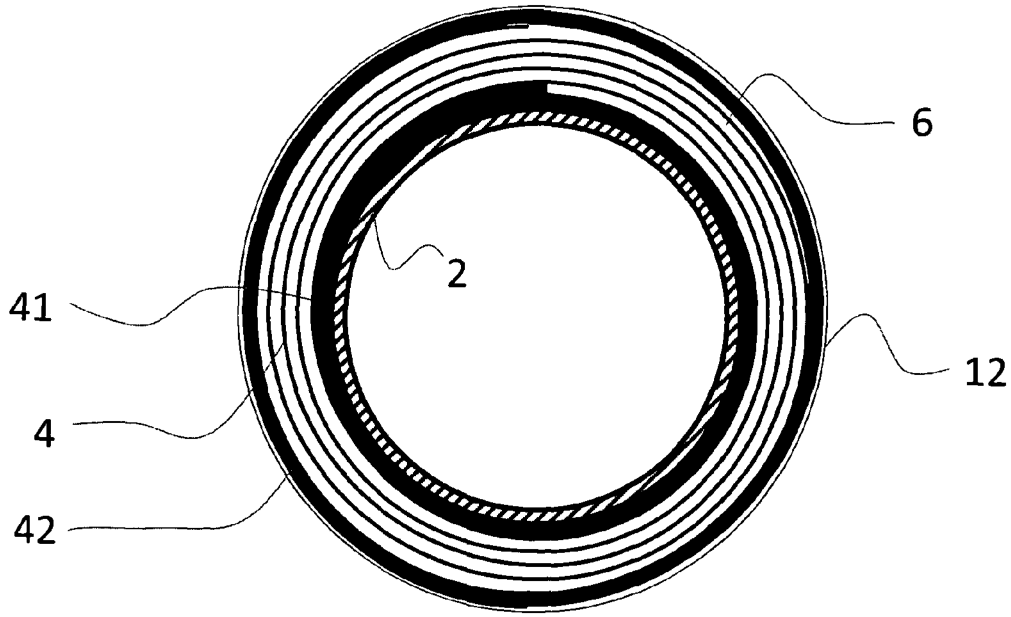
FIG. 1 illustrates the cross section of a glass roll according to the present invention.

Referring now to the drawings, and more particularly to FIG. 1, there is shown glass roll 1 including three intermediate material layers wound onto one winding core 2 and forming the inside intermediate material layer 41. Subsequently, the glass film and the intermediate material are wound in alternate layers, so that n glass layers 6 and n intermediate material layers 4 are deposited on glass roll 1. The outside intermediate material layer 42 is furthermore depicted boldly with additional intermediate material layers. To secure outside intermediate material layer 42 against independent unwinding one or several fastening tapes 12 are placed around the outside of glass roll 1. Intermediate material layers 4 are compressed and act upon glass film layers 6 with a restoring pressure of 50 to 100 kPa so that glass roll 1 is compact and pre-stressed in itself and that glass film layers 6 are held in the glass roll.

Figure 2:
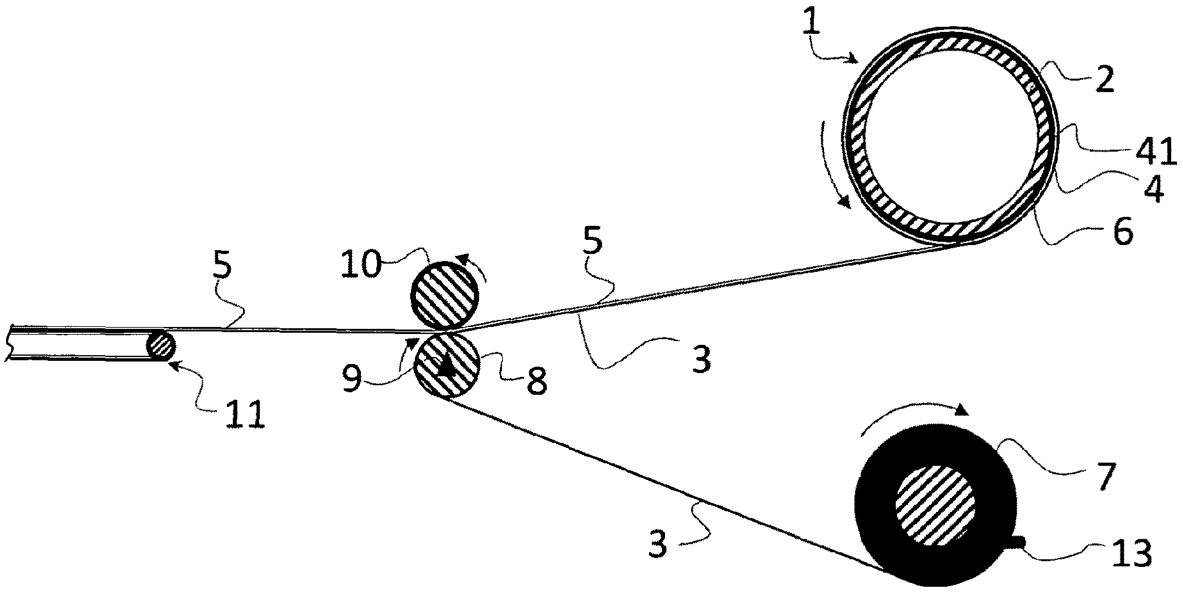
FIG. 2 illustrates an example of a winding device to produce a glass roll according to the present invention.

To produce such a glass roll 1 according to FIG. 1, a winding mechanism, for example according to FIG. 2, is used. A continuous glass film ribbon 5 having a width of approximately 500 mm and a thickness of approximately 50 μm is formed and drawn in a down-draw line which is not illustrated here. It is transported by conveyor belt 11 to guide roller pair 8, 10 and from there to glass roll 1 which is to be wound. Mounted on a non-illustrated drive shaft is a winding core 2 consisting of sturdy cardboard and having a core diameter of, for example, 400 mm onto which initially three layers of an intermediate material 3 are wound which form inside intermediate material layer 41. Intermediate material 3 is a foam film consisting of cross-linked closed cell polyolefin foam having a thickness of 1 mm as offered, for example under the brand name Alveolit TA 1001 by Sekisui Alveo AG, Lucerne. Intermediate material 3 is provided by and unwound from an intermediate material supply roll 7. It is hereby guided around intermediate material guide roller 8 and wound onto winding core 2 which rotates in a direction opposite to intermediate material supply roll 7.

After winding the three inside intermediate material layers 41 the start of glass film ribbon 5 is inserted into the wedge which is formed by intermediate material layer 41 and incoming intermediate material 3, so that the glass film is moved along by developing glass roll 1, or respectively the driven winding core, and is embedded between the layers of intermediate material 3. Glass film 5 and intermediate material 3 are now wound as alternating layers in respectively n layers, until a total glass film length of approximately 1000 m is wound onto glass roll 1.

The glass film is subsequently cut to length. For this purpose a mechanical scoring and/or a separating method are applied by use of a laser, for example a laser scribing method. In the latter the glass is heated along a precisely defined line by a bundled laser beam, normally a $CO_2$ laser beam, and a thermal stress is produced in the glass by an immediately following cold jet of compressed air or air-liquid mixture of a magnitude that the glass cracks along the predefined edge. Subsequently several more, for example at least two 2, layers of intermediate material 3 are wound around the glass roll to create outside intermediate material layer 42. To prevent independent unwinding of outside intermediate material layers 42 they are held in place with three fastening tapes 12. These prevent a decompression of entire glass roll 1, so that glass roll 1 can be securely stored and transported with tightly secured glass film layers 6. The glass roll has an outside diameter of approximately 650 mm and a weight of approximately 110 kg.

Intermediate material 3 is wound onto winding core 2 or respectively onto glass film layers 6 under a pre-stress or respectively tensile stress acting in a longitudinal direction so that it is positioned as compressed intermediate material layers 4, 41, and 42 underneath and/or above individual glass film layers 6. In order to control the pre-stress, or respectively the tensile stress, a sensor 9 is connected to intermediate material guide roller 8 which measures the tensile force of intermediate material 3 between driven glass roll 1, or respectively the winding core and brake-equipped intermediate material supply roll 7. Sensor 9 is for example a tension measuring roller which measures the pressure which results from the intermediate material wrapping around roll 8, depending on the brake effect of brake device 13. Depending upon a predefined desired value the intermediate material supply roll 7 is braked by a brake device 13 to an extent which is required to adjust the desired tensile force. This always longitudinally oriented tensile force causes a pre-stress in wound intermediate material 3 which then always acts upon the glass film layer which was last wound. In the endeavor to again expand, it applies a restoring pressure in glass roll 1 upon glass film layers 6, thus holding them in place in the glass roll. Intermediate material 3 is at the same time stretched due to the tensile force. In an effort to retract again in its length it exerts an additional force upon glass film layers 6 in glass roll 1, thereby holding them in place in the glass roll.

In another example according to the present invention a glass film is provided by a glass film supply roll and is fed via guide roller pair 8, 10 to glass roll 1 which is to be wound. Winding core 2, or respectively glass roll 1 which is to be wound, is also mounted in this case on a driven device. In this case this device not only pulls intermediate material 3 from intermediate material supply roll 7, but also glass film 5 from the glass film supply roll. In this example glass film 5 is also wound at a pre-stress or respectively tensile stress onto glass roll 1, whereby a brake device in the unwind unit and a sensor in the glass film guide roll is provided for the glass film supply roll. The sensor measures the tensile force of the glass film. The unwind device for the glass film supply roll is braked via a control unit to the extent that the required tensile force is adjusted. This permits reliable adjustment to a defined wound roll hardness and compression of intermediate material 3 in glass roll 1, thus securely holding glass film layers 6 in place in glass roll 1.

Figure 3:
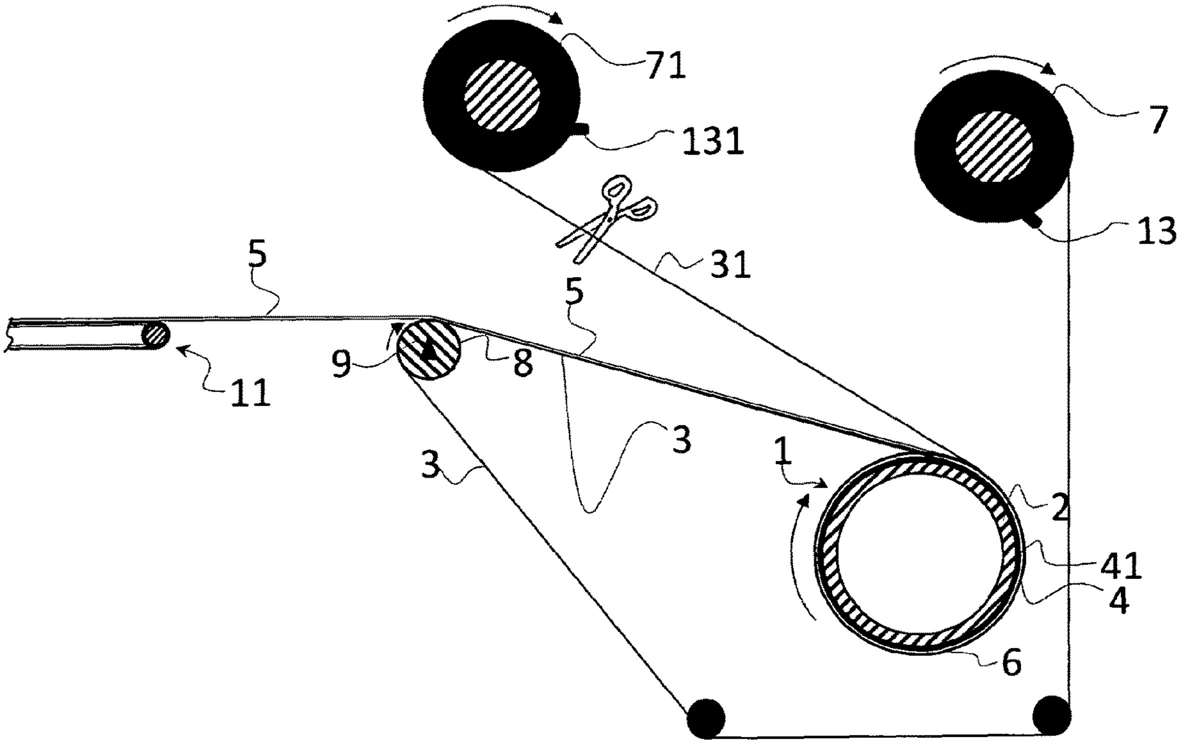
FIG. 3 illustrates an alternative winding device to FIG. 2, to produce a glass roll according to the present invention.

Referring now to FIG. 3, there is shown an example of an alternative winding device to that illustrated in FIG. 1 for the production of a glass roll according to the present invention. Here a differently oriented winding device is provided for the glass roll which, depending upon the circumstances, is advantageous in the supply of the glass film. In order to provide a wedge for inserting the glass film in this embodiment after pre-depositing inside intermediate material layer 41, an additional intermediate material supply roll 71 is provided. Intermediate material from both supply rolls 7 and 71 is wound onto winding core 2 to form intermediate material layer 41. The start of the ribbon of glass film 5 is inserted in the resulting wedge so that the glass film 5 is carried along by the resulting glass roll 1 or respectively by the driven winding core and is embedded between the layers of intermediate material 3 and 31. After a few wound layers intermediate material 31 is severed so that subsequently only intermediate material 3 is wound in n layers in alternating layers with glass film 5 until a total glass film length of 1000 mm is wound on glass roll 1.

The glass film is subsequently cut to size and additional, at least 2 more layers of intermediate material 3 are wound around the glass roll to form outer intermediate material layer 42. Outside intermediate material layers 42 are wrapped with a strong adhesive tape in order to prevent independent unwinding of them. This avoids a decompression of entire glass roll 1, so that it can be securely stored and transported with glass film layers 6 securely held in place. The glass roll has an outside diameter of approximately 650 mm and a weight of approximately 110 kg.

Intermediate material 3 and 31 is wound onto winding core 2 or respectively onto glass film layers 6 under a pre-stress or respectively tensile stress acting in the longitudinal direction so that it is positioned as compressed intermediate material layers 4, 41, 42 underneath and/or above individual glass film layers 6. In order to control the pre-stress, or respectively the tensile stress, sensor 9 is connected to the intermediate material guide roller 8 which measures the tensile force of intermediate material 3 between driven glass roll 1, or respectively the winding core and brake-equipped intermediate material supply roll 7. Depending upon a predefined desired value intermediate material supply roll 7 is braked by brake device 13 to an extent which is required to adjust the desired tensile force. The tensile force of intermediate material 31 is adjusted via braking device 131, which acts upon intermediate material supply roll 71, depending upon the speed of rotation of winding core 2. This always longitudinally oriented tensile force causes a pre-stress in wound intermediate material 3, 31 which then always acts upon the glass film layer which was last wound. In the endeavor to again expand, it applies a restoring pressure in glass roll 1 upon glass film layers 6, thus holding them in place in the glass roll. Intermediate material 3, 31 is at the same time stretched due to the tensile force. In an effort to retract again in its length it exerts an additional force upon glass film layers 6 in glass roll 1, thereby holding them in place in the glass roll.

Figure 4A:
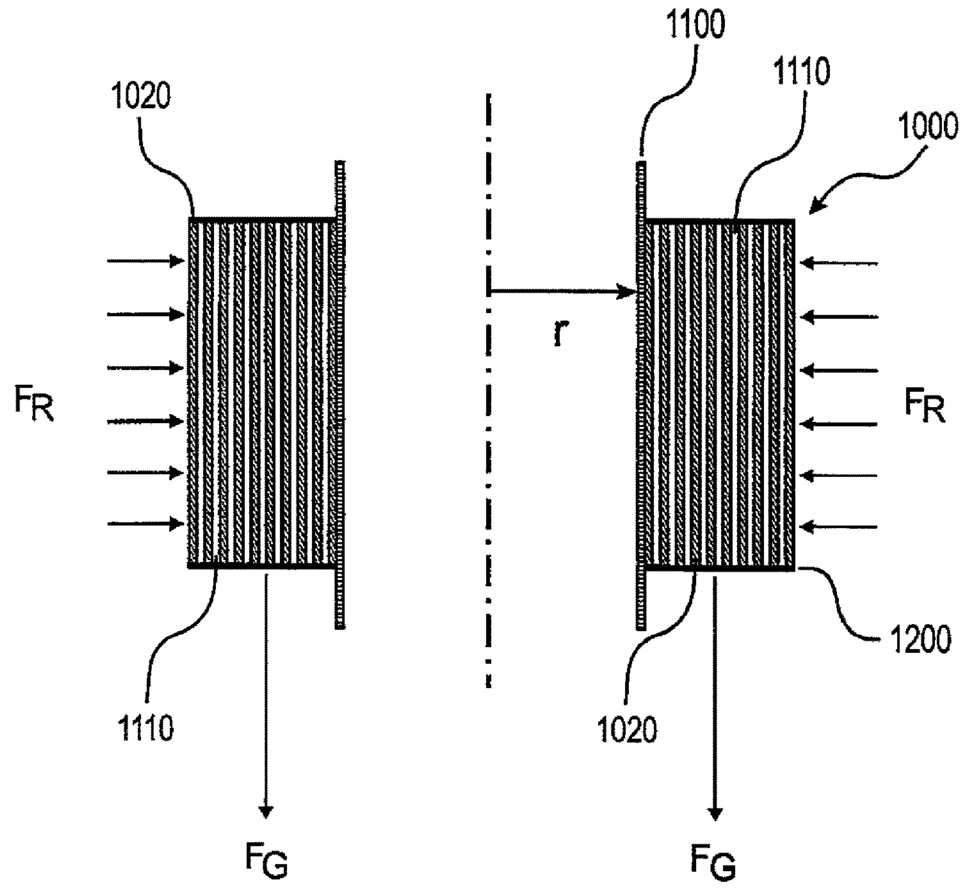
FIGS. 4A-4B illustrate the longitudinal section of a wound glass roll according to the present invention.
Figure 4B:
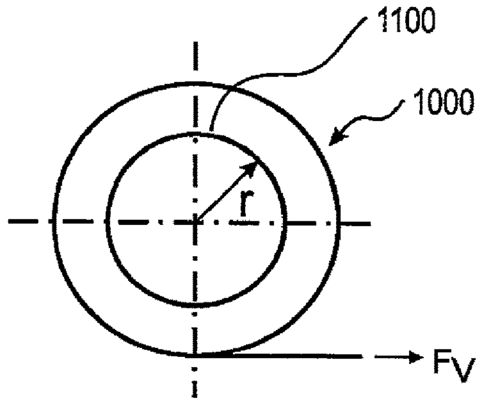

Referring now to FIGS. 4A and 4B, there is shown a wound roll 1000 where a glass ribbon was wound with intermediate layers onto a cylinder 1100 in the form of a winding core having a radius r. FIG. 4A illustrates a vertically positioned wound roll 1000 and FIG. 4B shows a longitudinal section of wound roll 1000. Wound roll 1000 consists of a plurality of glass layers 1110 which are separated from the respective adjacent layer by an intermediate layer or respectively intermediate layers 1020. In one embodiment of the present invention, the thickness of the glass layer is approximately 0.05 mm and that of the intermediate layer approximately 0.5 mm.

The radial force acting upon the roll is identified as FR, the weight force of the roll as FG. The extent of the radial force is determined by the pre-stress force FV with which the glass roll is wound and which is essentially applied by the intermediate layer. To avoid that side wall 1200 of the wound roll shifts parallel to the axis, or respectively shifts axially, and wound roll 1000 thus telescopes, radial force FR—which again in addition to the number of layers n in the wound roll and the coefficient of friction μ determines friction FF between the material to be wound and the core—must be greater than weight force FG.

When knowing parameters μ for the coefficient of friction and the number of layers n, friction FF between the material which is to be wound and the winding core result:

$$FF=PF*AF*\mu=FR*\mu*n$$

For the weight force the following results from the above example:

$$FG=m*g=\left(t1*b*\pi*\left(2r*n+2*(t1+t2)*\left(n*\frac{n+1}{2}\right)\right)\right)*\rho*g$$

whereby t1 identifies the glass thickness, n again the number of wound layers, t2 the thickness of the intermediate layer, p the specific glass weight and g the g-acceleration. If the requirement is for friction FF to be greater than the weight force of the wound roll then the pre-stress at a predetermined number n of layers in the wound roll can easily be determined because of FV=FR.

FIG. 4B illustrates a longitudinal section of a wound roll where the roll radius of winding core r is shown, as well as pre-stress force FV with which the roll is wound and which again determines the radial force in the wound roll. According to the present invention the pre-stress force is applied, for example in the intermediate layer.

Figure 5:
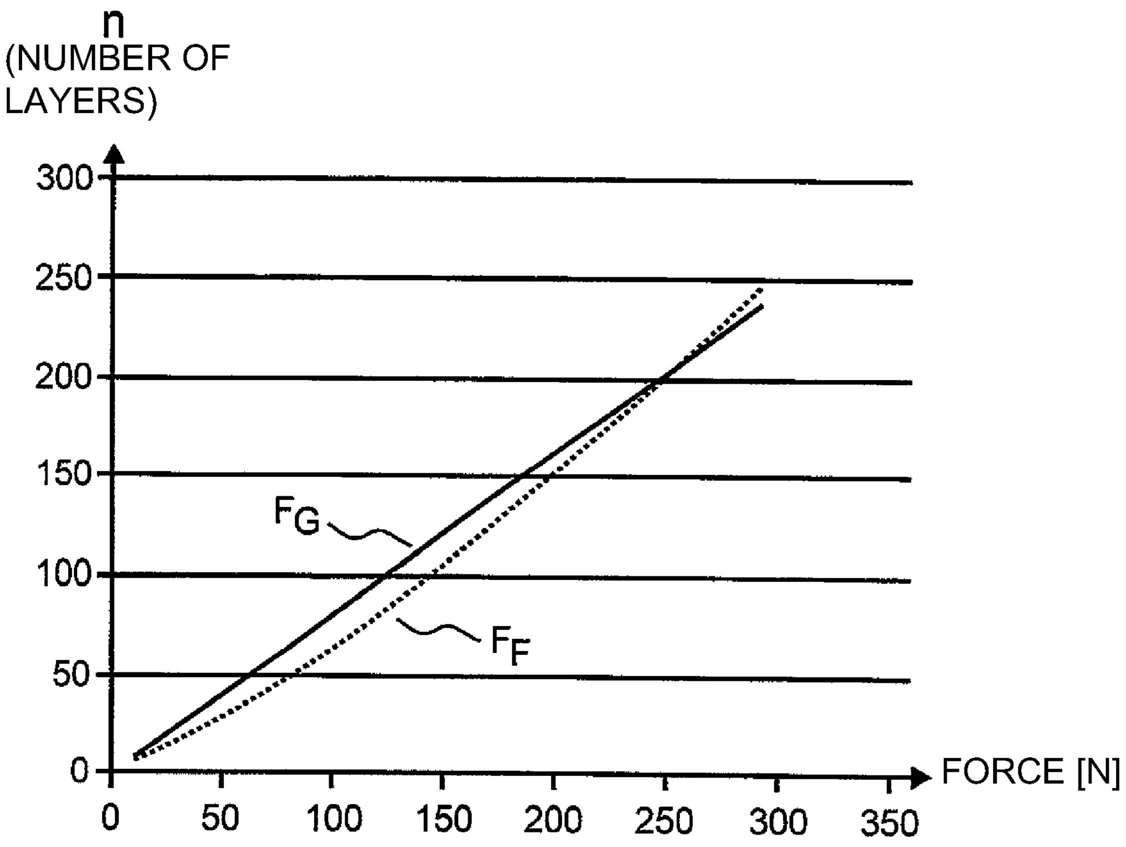
FIG. 5 illustrates the weight force and the friction in dependency upon the number of wound layers for one embodiment of the present invention.

Referring now to FIG. 5, there is shown forces FR in Newton and FG in Newton which result from the aforementioned formulas for one embodiment with a pre-stress force of FV=0.7 Newton, ρ=2.3 kilograms per cubic decimeter ($kg/dm^3$), a thickness t1 of 0.05 mm for the glass layer and t2=0.5 mm for the intermediate layer, whereby the coefficient of friction is μ=1.1 and the roll radius was r=200 mm. The selected glass material width was b=400 mm.

As can be seen from FIG. 5, at the selected parameters the weight force FG is always lower than friction FF which results from radial force FR. The radial force is again adjusted by the pre-stress force. Only at a number of approximately 180 to 190 layers the curves of FG and friction FF intersect in the embodiment illustrated in FIG. 5, so that for more than 200 layers the static friction between the layers is no longer sufficient to compensate the weight force and to ensure that no telescoping of the wound roll occurs.

Even though the embodiment in this case is provided for a special glass—AF32eco by Schott AG and an exemplary pre-stress of FV=0.7 Newton was specified it is possible with the previously specified formulas to determine for any glass type and pre-stress at what number of glass layers telescoping of the glass roll occurs, or respectively what pre-stress force is necessary with a predetermined number of glass layers in order to prevent telescoping.

The alkaline-free glass AF 32 eco had the following composition in weight-%:

| | |
|---|---|
| $SiO_2$ | 61 |
| $Al_2O_3$ | 18 |
| $B_2O_3$ | 10 |
| CaO | 5 |
| BaO | 3 |
| MgO | 3 |

The transformation temperature Tg of the glass is 717° C. Its density is 2.43 grams per cubic centimeter ($g/cm^3$). The root mean square average Rq of the top and underside of the glass film is between 0.4 and 0.5 nm. The surface is therefore extremely smooth.

Figure 6A:
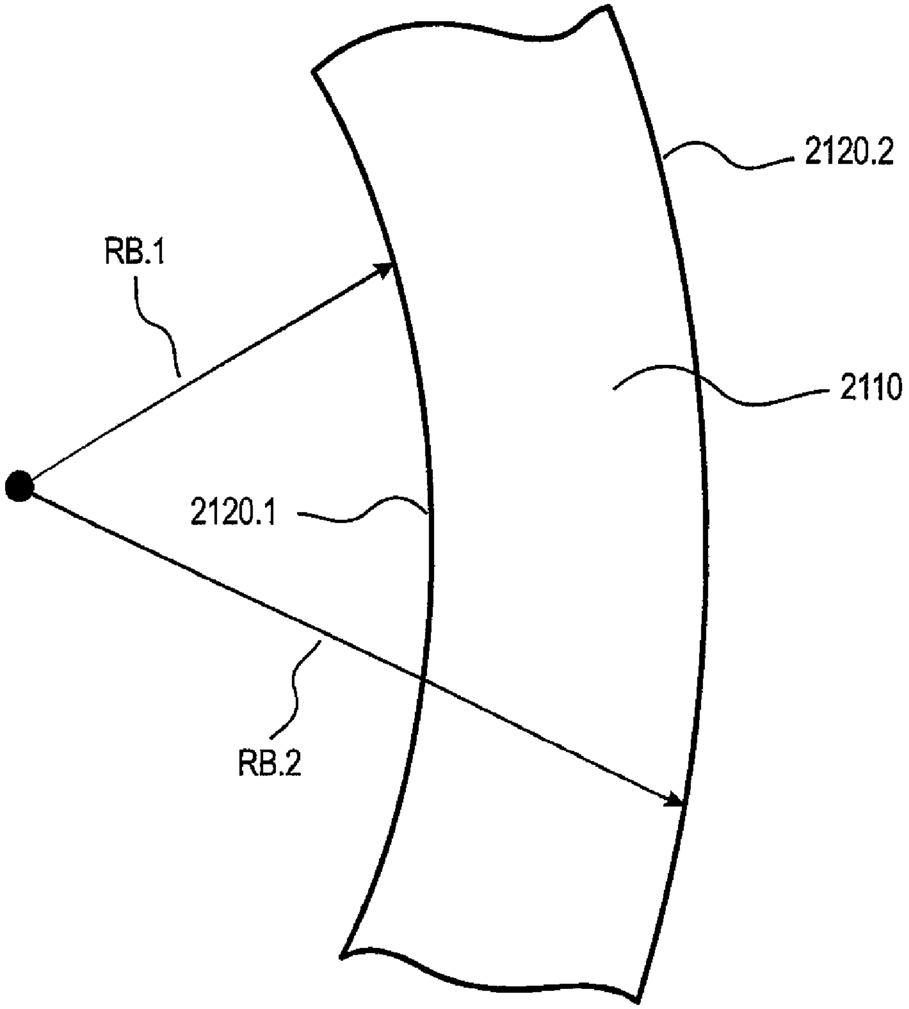
FIG. 6A illustrates a top view onto a glass ribbon placed in a plane on a glass roll, with a curvature of the edges according to the present invention.
Figure 6B:
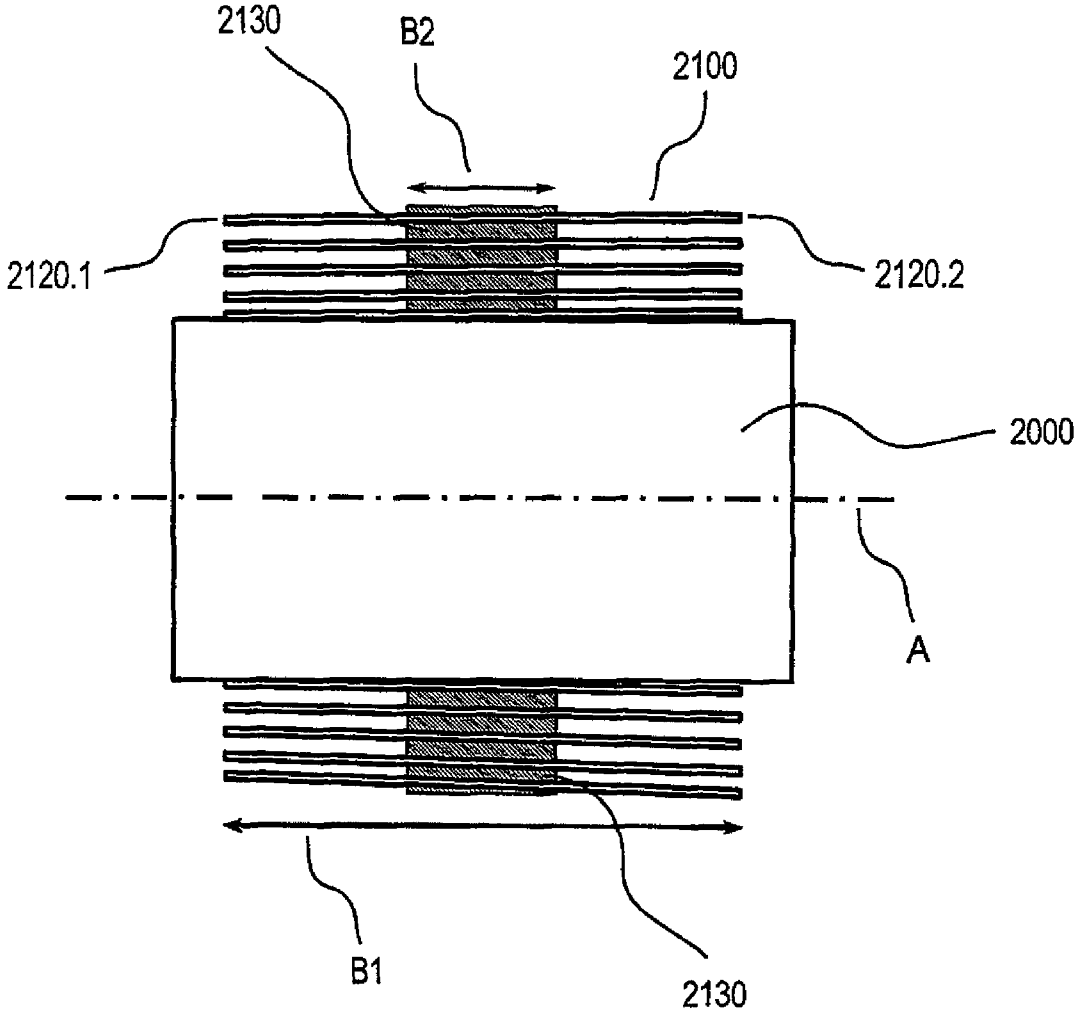
FIG. 6B illustrates a section through a glass roll with wound intermediate layers whose width is less than the width of the glass roll, whereby the glass ribbon in the plane can have a curvature as illustrated in FIG. 6A.

Referring now to the FIGS. 6A and 6B there is shown an embodiment wherein several glass layers 2100 are wound onto a winding core 2000 around axis A. Intermediate layers 2130 between individual glass layers 2100 do not extend over the entire width B of the wound glass roll. Width B2 of the intermediate material, or respectively intermediate layer 2130, is clearly shorter than width B1 of the glass layers.

The structure of the wound roll can be seen in FIG. 6B. FIG. 6A is a top view of the unwound glass ribbon 2110 which forms several glass layers 2100 when being wound onto winding core 2000. As can be seen in FIG. 6A, edges 2120.1, 2120.2 of glass ribbon 2110 are not parallel, but have a certain curvature. Inside edge 2120.1 can, for example, be described by a radius of curvature RB1, the outside by a radius of curvature RB2. Radius of curvature is RB1; RB2 is very large and is in the range of, for example, one to several kilometers. Radius of curvature RB1 of inside edge 2120.1 is generally smaller than radius of curvature RB2 of outside edge 2120.2. If a glass ribbon as illustrated in FIG. 6B is now wound into a wound roll as shown in FIG. 6A, the distance between the individual glass layers without compensating intermediate layer would generally be greater on outside edge 2120.2 than on inside edge 2120.1. In other words, the pressure in the wound roll would be greatest at inside edge 2120.1. These effects can be compensated by the embodiment illustrated in FIG. 6A wherein intermediate layer 2130 whose width is substantially less than that of the glass layers is placed in the center of glass ribbon 2100. A wound roll is thus obtained which allows an essentially free spacing and thereby stress-free winding of the individual glass layers left and right of the intermediate layer on outside edge 2120.2 and inside edge 2120.1.

Even though only one single intermediate layer ribbon is shown as intermediate layer 2130 in FIG. 6B it is possible to provide a plurality of such intermediate layers in order to cover the entire width B1 of the glass. It is however preferred to provide only one centered intermediate layer to compensate curved glass ribbons.

As previously outlined, geometric unevenness of the glass surface, such as waviness and warp can easily be compensated by the intermediate layers which extend only over a part of width B1 of the entire glass layer without force transmission into the respective material of the intermediate layer increasing excessively, either locally or over a region.

The present invention includes aspects which are disclosed in the following clauses, which are part of the description but which are not claims.

CLAUSES

1. A glass roll includes at least one glass film and one intermediate material which are wound one on top of the other in at least two layers onto a winding core. The glass film layers are held in place by the intermediate material layers.
2. The glass roll according to clause 1, wherein the glass film layers are held in place by a compressed intermediate material.
3. The glass roll according to clause 2, wherein the glass film layers are held in place by a compressed intermediate material which applies a restoring pressure against the glass film layers.

4. The glass roll according to one of the preceding clauses, wherein the intermediate material is in the embodiment of a foam film.
5. The glass roll according to clause 4, wherein the intermediate material is a polyolefin foam, for example a cross-linked polyolefin foam.
6. The glass roll according to one of the clauses 1 to 3, wherein the intermediate material is an embossed or other structured paper or cardboard.
7. The glass roll according to one of the preceding clauses, wherein the glass film has a thickness of a maximum of 350 µm, for example a maximum of 100 µm, a maximum of 50 µm, or a maximum of 30 µm.
8. The glass roll according to one of the preceding clauses, wherein the glass film has a thickness of at least 5 µm, for example at least 10 µm, or at least 15 µm.
9. The glass roll according to one of the preceding clauses, wherein the glass film has a fire-polished surface on at least one surface of its two sides,
10. The glass roll according to one of the preceding clauses, wherein the glass film has a root mean square average (RMS) Rq on at least one surface of its two sides of a maximum of 1 nanometer, for example a maximum of 0.8 nanometers, or a maximum of 0.5 nanometer.
11. The glass roll according to one of the preceding clauses, wherein the glass film has an average surface roughness Ra on at least one surface of its two sides of a maximum of 2 nanometers, for example a maximum of 1.5 nanometers, or a maximum of 1 nanometer.
12. The glass roll according to one of the preceding clauses, wherein the glass film is coated on at least one of its sides with a plastic layer, such as a polymer layer.
13. The glass roll according to clause 12, wherein the plastic layer provides the intermediate material.
14. The glass roll according to one of the preceding clauses, wherein the intermediate material is formed by several intermediate material layers.
15. The glass roll according to clause 14, wherein the several intermediate material layers have different widths.
16. The glass roll according to one of the preceding clauses, wherein the intermediate material layers protrude laterally over the glass film layers.
17. The glass roll according to one of the preceding clauses, wherein the glass film layers are held in place by the intermediate material layers due to a static friction $F_S$ in the range of 0.15 to 10 N, for example 1 to 10 N which acts between the glass film layers and the intermediate material layers.
18. The glass roll according to one of the preceding clauses, wherein the glass film layers are held in place by the intermediate material layers due to a frictional force $F_D$ in the range of 0.15 to 5 N, for example 0.2 to 2.5 N or to 2.5 N which acts between the glass film layers and the intermediate material layers.
19. A method to produce a glass roll in accordance with the preceding clauses, includes the following steps:
    a) provision of a glass film, a winding core and a compressible intermediate material;
    b) winding of at least one inside layer of the intermediate material onto the winding core;
    c) winding of the glass film and the intermediate material onto the winding core in such a manner that the glass film is wound onto the winding core in alternating layers with the intermediate material, whereby the intermediate material and/or the glass film is wound at a tensile stress acting in a longitudinal direction which causes a compression of the intermediate material; and
    d) holding the glass film end in place on the glass roll.
20. The method to produce a glass roll according to clause 17, wherein the glass film end is held in place by at least one outer layer of the intermediate material.
21. Use of a compressible material, for example a foam film, as the intermediate material between a glass film in a glass roll, wherein the intermediate material is wound onto a winding core alternatively with the glass film in at least always two layers, and the glass film layers can be held in place by the intermediate material layers.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Component identification list:

| | |
|---|---|
| (1) | Glass roll |
| (2) | Winding core |
| (3, 31) | Intermediate material |
| (4) | Intermediate material layer |
| (41) | Inner intermediate material layer |
| (42) | Outer intermediate material layer |
| (5) | Glass film |
| (6) | Glass film layer |
| (7, 71) | Intermediate material supply roll |
| (8) | Intermediate material guide roller |
| (9) | Sensor |
| (10) | Glass film guide roll |
| (11) | Conveyor |
| (12) | Fastening tape |
| (13, 131) | Braking device |
| (1000) | Wound roll |
| (1020) | Intermediate layer |
| (1110) | Glass layer |
| (1200) | Side wall |
| (2000) | Winding core |
| (2100) | Glass layer |
| (2110) | Glass ribbon |
| (2120.1, 2120.2) | Inside edge/Outside edge |
| (2130) | Intermediate layer |

What is claimed is:

1. A glass roll, comprising:

a winding core;

at least one glass film having a first width and a fire-polished surface on at least one surface of two sides of said at least one glass film, said at least one glass film having a root mean square average on at least one said surface of said two sides of a maximum of 1 nanometer (nm); and an intermediate material wound with said at least one glass film one on top of another onto said winding core in at least two layers defining a plurality of glass film layers and a plurality of intermediate film layers, said intermediate material layers holding said glass film layers in place, wherein said intermediate material having a second width narrower than said first width and including at least one intermediate layer ribbon or an intermediate layer, and wherein said second width of said intermediate material is in a range of between approximately 10% and 70% of said first width of said at least one glass film, wherein said intermediate layers holding said glass film layers in place are formed of a compressed intermediate material, said compressed intermediate material being configured to apply a restoring pressure against said glass film layers that is greater than 75 kPa and no more than 100 kPa, wherein a pre-stress force (FV) is selected such that friction (FF) between the wound intermediate layer and at least one glass film and the winding core is greater than a force of weight (FG) of said wound roll using a plurality of parameters of said at least one glass film including:

a material width (b);

a roll radius (r);

a thickness (t1);

a thickness of said intermediate layers (t2);

a coefficient of friction (μ);

a glass density (p); and a known number (n) of wound layers of said at least one glass film.

2. The glass roll according to claim 1, said intermediate material being a foam film.

3. The glass roll according to claim 2, said intermediate material being a polyolefin foam.

4. The glass roll according to claim 1, said at least one glass film having a thickness of a maximum of approximately 350 micrometers (μm).

5. The glass roll according to claim 4, said thickness of said at least one glass film being at least 5 μm.

6. The glass roll according to claim 1, said at least one glass film having a thickness of between approximately 15-30 μm.

7. The glass roll according to claim 1, wherein at least one said surface of said at least one glass film has an average surface roughness Ra of a maximum of 2 nm.

8. The glass roll according to claim 1, wherein at least one said surface of said at least one glass film has an average surface roughness Ra of a maximum of 1 nm.

9. The glass roll according to claim 1, said at least one glass film is coated on at least one of said two sides with said intermediate material, said intermediate material comprising a plastic layer.

10. The glass roll according to claim 1, wherein said intermediate material is a plurality of material layers.

11. The glass roll according to claim 10, wherein said intermediate material layers have a plurality of different widths.

12. The glass roll according to claim 11, wherein said intermediate material layers protrude laterally over said glass film layers.

13. The glass roll according to claim 1, wherein said glass film layers are held in place by a force acting between said intermediate material layers and said glass film layers, said force including at least one of:

a static friction in a range of between 0.15 and 10 Newtons (N); and a frictional force in a range of between 0.15 and 5 N.

14. The glass roll according to claim 1, wherein said glass film layers are held in place by a force acting between said intermediate material layers and said glass film layers, said force including a static friction in a range of between 1 and 10 N.

15. The glass roll according to claim 1, wherein said glass film layers are held in place by a force acting between said intermediate material layers and said glass film layers, said force including a friction force in a range of between 0.2 and 2.5 N.

16. The glass roll according to claim 1, wherein said glass film layers are held in place by a force acting between said intermediate material layers and said glass film layers, said force including a friction force in a range of between 1 and 2.5 N.

17. The glass roll according to claim 1, wherein: said intermediate material comprises a plurality of intermediate layer ribbons, wherein each intermediate layer ribbon of said plurality of intermediate layer ribbons has a width in a range between approximately 0.1% and 10% of said first width of said at least one glass film such that said second width of said intermediate material including said plurality of intermediate layer ribbons is in a range of between approximately 10% and 50% of said first width of said at least one glass film; or said intermediate material includes said intermediate layer and said second width of said intermediate material including said intermediate layer is in a range between approximately 10% and 50% of said first width of said at least one glass film.

18. The glass roll according to claim 1, wherein the compressed intermediate material is configured to apply a restoring pressure against the glass film layers that is greater than 80 kPa and no more than 100 kPa.

* * * * *